US011996627B2

(12) United States Patent
Hayes et al.

(10) Patent No.: US 11,996,627 B2
(45) Date of Patent: May 28, 2024

(54) DIGITAL BEAMFORMING FIN ANTENNA ASSEMBLY

(71) Applicant: SMARTSKY NETWORKS LLC, Morrisville, NC (US)

(72) Inventors: Gerard James Hayes, Wake Forest, NC (US); Koichiro Takamizawa, Silver Spring, MD (US); James O. Legvold, Willow Park, TX (US); Elbert Stanford Eskridge, Jr., Chapel Hil, NC (US); Mike Barts, Raleigh, NC (US); John Swartz, Durham, NC (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 436 days.

(21) Appl. No.: 17/297,033

(22) PCT Filed: Nov. 22, 2019

(86) PCT No.: PCT/US2019/062796
§ 371 (c)(1),
(2) Date: May 26, 2021

(87) PCT Pub. No.: WO2020/112541
PCT Pub. Date: Jun. 4, 2020

(65) Prior Publication Data
US 2021/0399419 A1 Dec. 23, 2021

Related U.S. Application Data

(60) Provisional application No. 62/772,827, filed on Nov. 29, 2018.

(51) Int. Cl.
*H01Q 3/36* (2006.01)
*H01Q 1/28* (2006.01)
(Continued)

(52) U.S. Cl.
CPC .............. *H01Q 3/36* (2013.01); *H01Q 1/28* (2013.01); *H01Q 1/42* (2013.01); *H01Q 1/48* (2013.01)

(58) Field of Classification Search
CPC .. H01Q 3/36; H01Q 1/28; H01Q 1/42; H01Q 1/48; H01Q 1/246; H01Q 9/32; H01Q 19/32
See application file for complete search history.

(56) References Cited

U.S. PATENT DOCUMENTS 4,336,543 A * 6/1982 Ganz .................. H01Q 21/08
343/705
5,606,333 A * 2/1997 Hannan .................. H01Q 21/10
343/815

(Continued)

FOREIGN PATENT DOCUMENTS

WO 2013089731 A1 6/2013

OTHER PUBLICATIONS

International Search Report and Written Opinion of International Application No. PCT/US2019/062796 dated Mar. 3, 2020, all enclosed pages cited.

*Primary Examiner* — Marc Anthony Armand
(74) *Attorney, Agent, or Firm* — Burr & Forman LLP (57) ABSTRACT

An antenna assembly includes a plurality of active antenna elements disposed in a first linear array along a reference line and equidistant from each adjacent antenna element by a first linear distance, and a plurality of passive antenna elements disposed in a second linear array extending parallel to the reference line such that each passive antenna element is a second linear distance away from a corresponding one of the active antenna elements. The antenna assembly includes or is operably coupled to a phase control module configured to apply selected phase fronts to selected ones of the antenna elements to generate constructive and destruc- (Continued)

tive interference patterns to define a directive beam in a desired direction in a range between about 0 and 180 degrees relative to the reference line.

12 Claims, 8 Drawing Sheets

(51) Int. Cl.
*H01Q 1/42* (2006.01)
*H01Q 1/48* (2006.01)

(56) References Cited

U.S. PATENT DOCUMENTS

| | | |
|---|---|---|
| 8,744,360 B2 | 6/2014 | Zheng |
| 2006/0229077 A1 | 10/2006 | Monk |
| 2010/0124210 A1 | 5/2010 | Lo |
| 2016/0205560 A1* | 7/2016 | Hyslop ................ H04W 16/14 |
| | | 455/454 |

* cited by examiner

DIGITAL BEAMFORMING FIN ANTENNA ASSEMBLY

CROSS REFERENCE TO RELATED APPLICATIONS

This application claims priority to U.S. application No. 62/772,827 filed Nov. 29, 2018, the entire contents of which are hereby incorporated by reference in its entirety.

TECHNICAL FIELD

Example embodiments generally relate to wireless communications and, more particularly, relate to an antenna assembly configured to enable directivity over about 180 degrees around the antenna assembly.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft.

As improvements are made to network infrastructures to enable better communications with in-flight receiving devices of various kinds, one area in which improvement may be possible is the airborne antenna. Due to limitations created by size and weight, as well as the rigors of certification requirements, a typical aviation antenna includes a flush-mounted (e.g. cavity, patch, and slot) element or an above-surface (e.g. monopole and dipole) configuration. In order to reduce or minimize aerial resistance (drag), a low mechanical form factor is also generally desirable. Accordingly, above-surface antennas are typically designed to provide a relatively broad area of coverage with a relatively low-gain. Thus, above-surface antennas are frequently constructed using ¼-wave, vertically-polarized monopole antennas or elevated horizontally-polarized dipoles. However, as the demand for improved performance of wireless communications with aviation platforms increases, the legacy designs for aviation antennas will also require improvement.

BRIEF SUMMARY OF SOME EXAMPLES

Some example embodiments may therefore provide antenna configurations that deliver improved characteristics which, when translated into network usage, may improve network performance so that air-to-ground (ATG) networks can perform at expected levels within reasonable cost structures. In some embodiments, an antenna configuration may be provided that can be employed in connection with directive and/or reflective elements to increase gain without significantly increasing size, weight or cost. The fact that the resulting antenna is directive allows beam steering that can improve interference reduction and also minimize overall network costs by enabling ground stations to be spaced farther apart. Accordingly, for example, signal coverage may be improved with relatively low cost equipment since fewer base stations may be needed to accommodate antennas that are multi-directional, and steerable with a relatively high gain.

In one example embodiment, an antenna assembly is provided. The antenna assembly may include a plurality of active antenna elements disposed in a first linear array along a reference line and equidistant from each adjacent antenna element by a first linear distance, and a plurality of passive antenna elements disposed in a second linear array extending parallel to the reference line such that each passive antenna element is a second linear distance away from a corresponding one of the active antenna elements. The antenna assembly includes or is operably coupled to a phase control module configured to apply selected phase fronts to selected ones of the antenna elements to generate constructive and destructive interference patterns to define a directive beam in a desired direction in a range between about 0 and 180 degrees relative to the reference line.

In another example embodiment, a phase control module for control of an antenna assembly is provided. The antenna assembly may include a plurality of active antenna elements disposed in a first linear array along a reference line and equidistant from each adjacent antenna element by a first linear distance, and a plurality of passive antenna elements disposed in a second linear array extending parallel to the reference line such that each passive antenna element is a second linear distance away from a corresponding one of the active antenna elements. The phase control module may include processing circuitry configured to apply selected phase fronts to selected ones of the antenna elements to generate constructive and destructive interference patterns to define a directive beam in a desired direction in a range between about 0 and 180 degrees relative to the reference line.

In yet another example embodiment, a method of forming a directive beam may be provided. The method may include receiving an indication of a location of a ground station relative to an in-flight aircraft, determining a pointing direction for steering a directive beam toward the location, and employing a phase control module for control of an antenna assembly of an aircraft to steer the directive beam toward the location. The antenna assembly includes a plurality of active antenna elements disposed in a first linear array along a reference line and equidistant from each adjacent antenna element by a first linear distance, and a plurality of passive antenna elements disposed in a second linear array extending parallel to the reference line such that each passive antenna element is a second linear distance away from a corresponding one of the active antenna elements. Employing the phase control module may include applying selected phase fronts to selected ones of the antenna elements to generate constructive and destructive interference patterns to define a directive beam in a desired direction in a range between about 0 and 180 degrees relative to the reference line.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals may be used to refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide architectures for improved air-to-ground (ATG) wireless communication performance via improved antenna design. In this regard, some example embodiments may provide for an antenna design that delivers improved gain (e.g., toward the horizon) in a multi-directional, but steerable structure. The improved gain toward the horizon may enable aircraft to engage in communications with potentially distant base stations on the ground. Accordingly, an ATG network may potentially be built with base stations that are much farther apart than the typical distance between base stations in a terrestrial network while employing directivity to steer beams from the aircraft toward the ground stations.

Conventional antennas are formed by embedding conductors of structured shapes within a surrounding medium. The surrounding medium can be air or other non-conducting (insulating) media. The resulting local fields and currents in response to the differently shaped material properties and alternating currents applied to the antenna input ports determine the direction and polarization of radiated fields as well as the observed frequency dependent impedance at the antenna port. A class of antennas that is used often is that of linear antennas such as straight monopole or dipole elements. These elements are often sized such that their length is approximately ½ or ¼ of the wavelength (λ) of the resonant frequency of the antenna, and as such they become resonant. At this resonance the input impedance is purely real and the reactive component vanishes. This is convenient as the antenna can be directly connected to a transmission line and the transmission line would not carry losses due to additional reactive fields or currents.

The geometry of vertically oriented linear antenna elements, and as such their radiating currents and fields, are generally independent of the azimuth angle of observation. Furthermore, the radiated or received field intensity (or directivity) of such elements is also independent of the azimuth angle. In other words, the radiation pattern is omni-directional (in azimuth) and has a characteristic radiation pattern in the elevation angle.

These principles can be used and slightly modified to take an otherwise omni-directional antenna element, and add directivity. For example, as will be described in greater detail below, if multiple elements are fed with a signal, and the elements are spaced apart by a given distance, phase control may be employed between the different elements to either create constructive interference (thereby increasing gain) or destructive interference (thereby reducing gain) in a given direction. Furthermore, reflective elements may be employed to enhance directivity in combination with the phase control. By controlling the application of phase over multiple elements in combination with reflectivity, it may be possible to effectively steer the direction of higher gain and thereby make it unnecessary to physically reorient an antenna in order to effectively steer a beam to a desired direction.

Accordingly, some example embodiments may provide an architecture that enables control to be provided to an antenna assembly to allow directivity to be achieved along one side of a linear or fin shaped antenna assembly. This architecture may be particularly useful for an aviation antenna where size, weight and cost can be very limiting, and it is desirable to maintain aerodynamic efficiency. Although the structures described herein may be useful in any ATG context, they may also be useful in other networks and at devices other than aircraft. However, an example embodiment will be described in relation to a particular ATG network that advantageously employs antennas that primarily look to the horizon in order to minimize interference and extend ranges of operation. This example network should therefore be appreciated as merely a non-limiting example of one network and one network architecture inside which example embodiments may be practiced.

Accordingly, for example, an ATG network may include a plurality of base stations on the ground having antenna structures configured to generate a wedge-shaped cell inside which directional beams may be focused. The wedge shaped cells may be spaced apart from each other and arranged to overlap each other in altitude bands to provide coverage over a wide area and up to the cruising altitudes of in-flight aircraft. The wedge shaped cells may therefore form overlapping wedges that extend out toward and just above the horizon. Thus, the size of the wedge shaped cells is characterized by increasing altitude band width (or increasing vertical span in altitude) as distance from the base station increases. Meanwhile, the in-flight aircraft may employ antennas that are capable of focusing toward the horizon and just below the horizon such that the aircraft generally communicate with distant base stations instead of base stations that may be immediately below or otherwise proximal (e.g., nearest) the aircraft. In fact, for example, an aircraft directly above a base station would instead be served by a more distant base station as the aircraft antennas focus near the horizon, and the base station antennas focus above the horizon. This leaves the aircraft essentially unaffected by the communication transmitters that may be immediately below the aircraft. Thus, for example, the same RF spectrum (e.g., WiFi), and even the same specific frequencies the aircraft is using to communicate with a distally located base station may be reused by terrestrial networks immediately below the aircraft. As a result, spectrum reuse can be practiced relative to terrestrial wireless communication networks and the ATG network and the ATG network may use a same band of frequency spectrum (e.g., the unlicensed band) as the terrestrial networks without interference.

In the ATG network, beamforming may be employed to steer or form directionally focused beams to the location of the airborne assets. This further facilitates interference mitigation and increases range. However, it generally also means that the aircraft (or assets thereon) should be tracked to continuously enable beamforming to be accurately conducted to serve the aircraft (or assets thereon).

Figure 1:
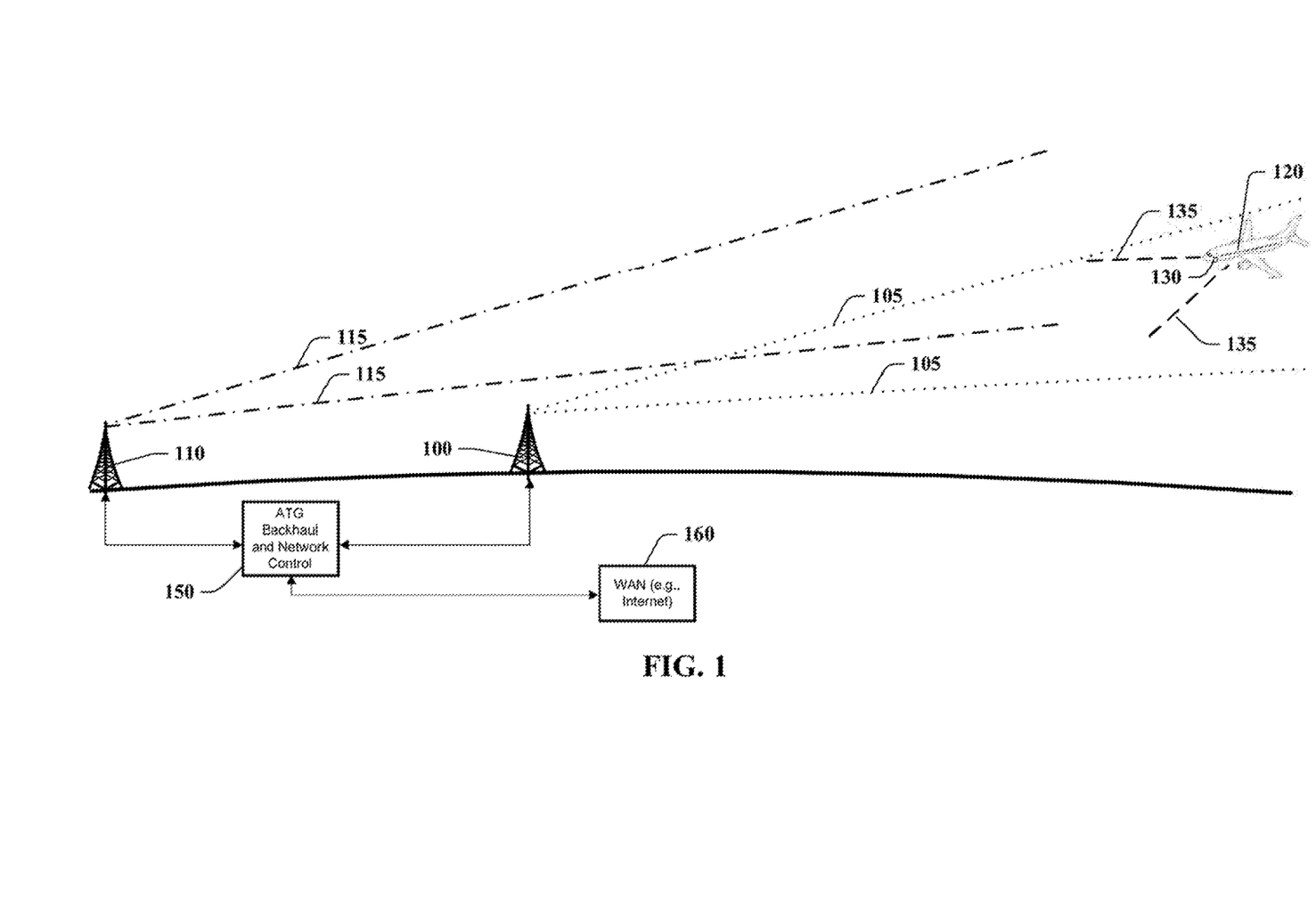
FIG. 1 illustrates a side view of a network topology of an ATG network employing aircraft with a directive antenna in accordance with an example embodiment.

FIG. 1 illustrates an example network architecture for providing ATG communication services between at least partially overlapping cells of the ATG network. FIG. 1 shows only two dimensions (e.g., an X direction in the horizontal plane and a Z direction in the vertical plane), however it should be appreciated that the wedge architecture of the ATG network may be structured to extend coverage also in directions into and out of the page (i.e., in the Y direction). Although FIG. 1 is not drawn to scale, it should be appreciated that the wedge shaped cells generated by the base stations for the ATG network may be configured to have a much longer horizontal component than vertical component. In this regard, the wedge shaped cells may have a horizontal range on the order of dozens to nearly or more than 100 miles. Meanwhile, the vertical component expands with distance from the base stations, but is in any case typically less than about 8 miles (e.g., about 45,000 ft).

As shown in FIG. 1, a first ATG base station 100 and a second ATG base station 110, which are examples of base stations employed in the ATG network as described above (e.g., employing wedge shaped cells) may be operating in a particular geographic area. The first ATG base station 100 may be deployed substantially in-line with the second ATG base station 110 along the X axis and may generate a first wedge shaped cell (defined between boundaries 105) that may be layered on top of a second wedge shaped cell (defined between boundaries 115) generated by the second ATG base station 110. When an in-flight aircraft 120 is exclusively in the first wedge shaped cell, the aircraft 120 (or wireless communication assets thereon) may communicate with the first ATG base station 100 using assigned RF spectrum (e.g., unlicensed spectrum) and when the aircraft 120 is exclusively in the second wedge shaped cell, the aircraft 120 (or wireless communication assets thereon) may communicate with the second ATG base station 110 using the assigned RF spectrum. The communication may be accomplished using beamforming to form or steer a beam toward the aircraft 120 within either the first or second wedge shaped cell based on knowledge of the location of the aircraft 120.

The aircraft 120 (or wireless communication assets thereon) may employ a radio and antenna assembly 130 configured to interface with the first and second ATG base stations 100 and 110 of the ATG network (and any other ATG base stations of the ATG network). The antenna assembly 130 may also be configured to be directed generally toward the horizon with steerable beams directed toward the first and second ATG base stations 100 and 110. In this regard, the antenna assembly 130 may be configured to generate a directive radiation pattern (defined between boundaries 135).

An area of overlap between the first wedge shaped cell and the second wedge shaped cell may provide the opportunity for handover of the in-flight aircraft 120 between the first ATG base station 100 and the second ATG base station 110, respectively. Beamforming may thus be used by each of the first and second base stations 100 and 110 to steer or form respective beams for conduct of the handover. Meanwhile, the antenna assembly 130 on the aircraft 120 may also be configured to form directive beams toward the first or second base stations 100 and 110 to ensure connectivity is maintained as the aircraft 120 moves and changes its relative location with respect to either of the first or second base stations 100 and 110. Accordingly, uninterrupted handover of receivers on the in-flight aircraft 120 may be provided while passing between coverage areas of base stations of the ATG network having overlapping coverage areas as described herein.

In an example embodiment, the ATG network may include ATG backhaul and network control components 150 that may be operably coupled to the first and second ATG base stations 100 and 110. The ATG backhaul and network control components 150 may generally control allocation of the assigned RF spectrum and system resources of the ATG network. The ATG backhaul and network control components 150 may also provide routing and control services to enable the aircraft 120 and any UEs and other wireless communication devices thereon (i.e., wireless communication assets on the aircraft 120) to communicate with each other and/or with a wide area network (WAN) 160 such as the Internet.

Given the curvature of the earth and the distances between base stations of the ATG network may be enhanced. Additionally, the base stations of the ATG network and the antenna assembly 130 of the aircraft 120 may be configured to communicate with each other using relatively small, directed beams that are generated using beamforming techniques, as mentioned above. The beamforming techniques employed may include the generation of relatively narrow and focused beams. Thus, the generation of side lobes (e.g., radiation emissions in directions other than in the direction of the main beam) that may cause interference may be reduced. However, using these relatively narrow and focused beams generally requires some accuracy with respect to aiming or selection of such beams in order to make the beams locate and track the position of the aircraft 120.

Figure 2:
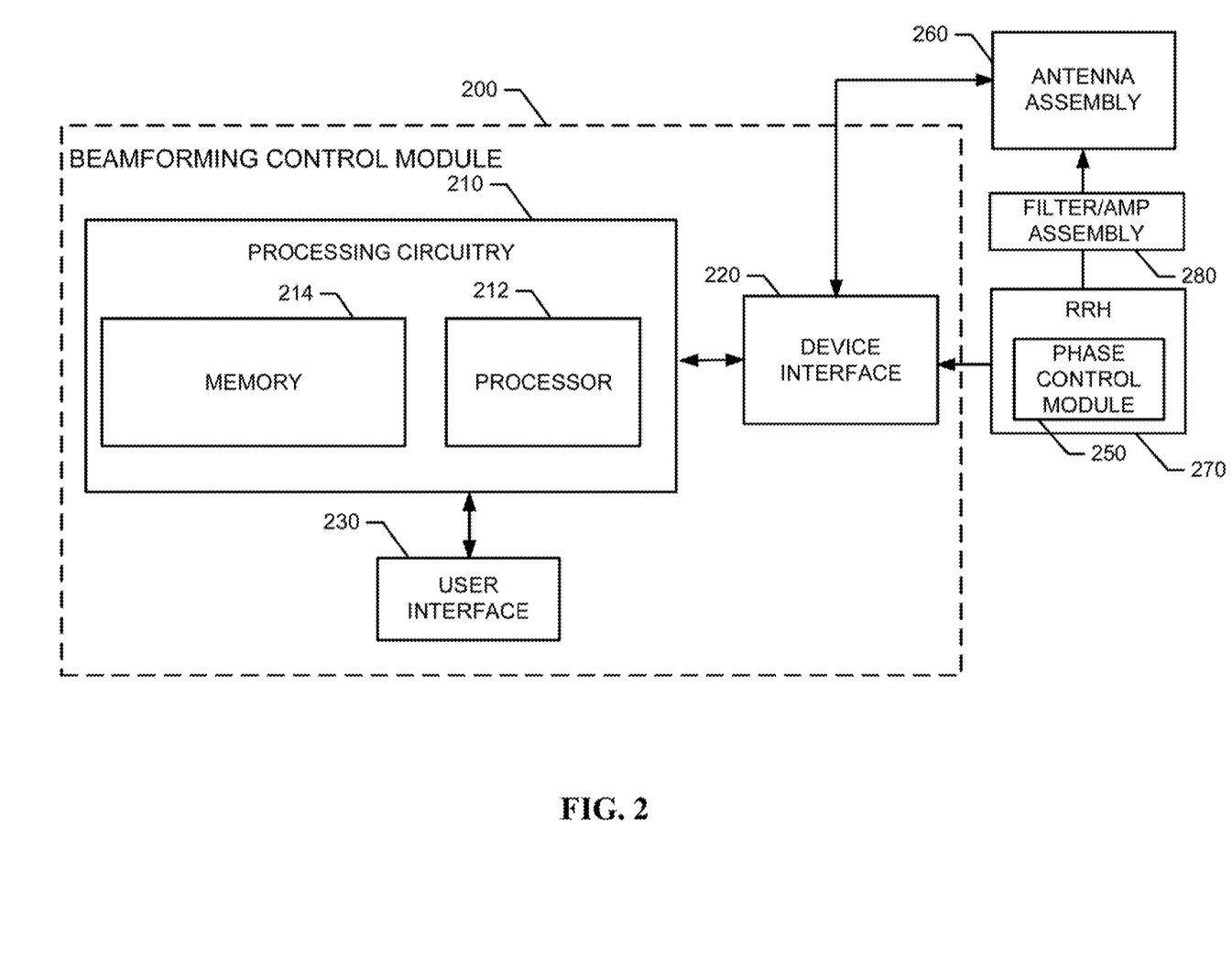
FIG. 2 illustrates a functional block diagram of a beamforming control module of an example embodiment.

In an example embodiment, beamforming control modules may be employed at radios or radio control circuitry of either or both of the aircraft 120 and the base stations of the ATG network. These beamforming control modules may use location information provided by components of the respective devices to direct beamforming to the location of the aircraft 120 or the base stations, respectively. FIG. 2 illustrates a block diagram of a beamforming control module 200 in accordance with an example embodiment. As shown in FIG. 2, the beamforming control module 200 may include processing circuitry 210 configured to manage the use of aircraft location/position information for conducting beamforming as described herein.

The processing circuitry 210 may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and, in some cases, a user interface 230 (which may be optional). As such, the processing circuitry 210 may be embodied as a circuit chip (e.g., an integrated circuit chip) configured (e.g., with hardware, software or a combination of hardware and software) to perform operations described herein. In some embodiments, the processing circuitry 210 may be embodied as a portion of a computer located in the core of the ATG network, or at a central location accessible to the ATG network. However, in other embodiments (e.g., when the beamforming control module 200 is located on the aircraft 120), the processing circuitry 210 may be part of the electronics of the aircraft 120 or a separate instance of circuitry otherwise disposed at the aircraft 120. In some embodiments, the processing circuitry 210 may communicate with various components, entities and/or sensors of the aircraft 120, or of the network to receive information used to determine where to point a beam. Thus, for example, the processing circuitry 210 may communicate with a sensor network of the aircraft 120, or other entities of the network to make determinations regarding where to point antenna beams.

The device interface 220 may include one or more interface mechanisms for enabling communication with other devices (e.g., base stations, modules, entities, sensors and/or other components of the aircraft 120 or the ATG network). In some cases, the device interface 220 may be any means such as a device or circuitry embodied in either hardware, or a combination of hardware and software that is configured to receive and/or transmit data from/to aircraft, base stations, modules, entities, sensors and/or other components of the ATG network that are in communication with the processing circuitry 210.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the operation of the beamforming control module 200 based on inputs received by the processing circuitry 210 indicative of the position/location of the aircraft 120 or base stations (and/or future positions of the aircraft 120 or base stations at a given time). As such, in some embodiments, the processor 212 (or the processing circuitry 210) may be said to cause each of the operations described in connection with the beamforming control module 200 in relation to processing location information for beam forming decisions based on execution of instructions or algorithms configuring the processor 212 (or processing circuitry 210) accordingly. In particular, the instructions may include instructions for determining that it is desirable to initiate formation of a beam in a particular direction and control of various components configured to control formation of the same.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the processing circuitry 210 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input from sensors and network components. Among the contents of the memory 214, applications and/or instructions may be stored for execution by the processor 212 in order to carry out the functionality associated with each respective application/instruction. In some cases, the applications may include instructions for directing formation of a steerable beam (or steering of a formed beam) in a particular direction as described herein. In an example embodiment, the memory 214 may store static and/or dynamic position information indicative of a location of the aircraft 120 or base station (e.g., now and in the future) for use in beamforming. The memory 214 may also or alternatively store parameters or other criteria that, when met, may trigger the execution of beam formation/steering and/or the manipulation of various components that are used for the same. Moreover, in some cases, the memory 214 may store a table of phase angles and differences that are to be used relative to driving various portions (or antenna elements) of antenna assembly 260 to achieve directionality to corresponding relative positions about the antenna assembly 260.

In an example embodiment, the beamforming control module 200 may include or otherwise control a phase control module 250. As such, in some cases, the processing circuitry 210 may also control the phase control module 250. In an example embodiment, the phase control module 250 may operate as a programmed module of the processing circuitry 210, but in other cases, the phase control module 250 may be a separate module (e.g., a separate ASIC or FPGA) having its own processing circuitry (which may be similar in form and/or function to the processing circuitry 210) configured to operate as described herein. In particular, the phase control module 250 may be configured to apply signal to respective selected antenna elements of the antenna assembly 260 with different phases to generate constructive/destructive interference patterns that generate a desired resultant beam as described herein.

The phase control module 250 may be configured to interface with an antenna assembly 260 (which may be an example of antenna assembly 130 of the aircraft 120, or an antenna of a base station). In particular, the phase control module 250 may interface with the antenna assembly 260 to select specific elements of the antenna assembly 260 that are to be driven with corresponding phasing to accomplish beam formation to form or steer a beam. In this regard, for example, the antenna assembly 260 may include a number of antenna elements that can be controlled by the phase control module 250 to effectively control the direction in which the antenna assembly 260 forms a receive or transmit beam. Accordingly, the structure of the antenna assembly 260 and the antenna elements therein may influence the operational requirements on the phase control module 250.

Of note, although the example of FIG. 2 illustrates the phase control module 250 as being separate from the beamforming control module 200, the phase control module 250 could instead part of the beamforming control module 200. Moreover, in some cases, the phase control module 250 may be a portion of the antenna assembly 260, or disposed between the beamforming control module 200 and the antenna assembly 260 (i.e., as part of the remote radio head). In any case, the phase control module 250 may be operably coupled to each of the beamforming control module 200 and the antenna assembly 260 to enable radio control signals to be used to influence directivity of a resulting antenna as described herein. By changing the phasing of signal applied to the antenna elements, beam steering can be accomplished as described herein.

In some cases, a remote radio head (RRH) 270 may be disposed between the beamforming control module 200 and the antenna assembly. The RRH 270 may include RF circuitry and analog-to-digital and/or digital-to-analog converters. The RRH 270 may also include up/down converters and have operational and management capabilities (e.g., relating to directive beam formation). As such, for example, the phase control module 250 may, in some cases, be a part of the RRH 270, as shown in FIG. 2. In example embodiment, the RRH 270 further includes a high-frequency transmitter, and the RRH 270 is provided proximate to the antenna assembly 260. However, in some cases, a filter/amplifier assembly 280 may be provided as part of the RRH 270 or otherwise between the RRH 270 and the antenna assembly 260. The filter/amplifier assembly 280 may include a ceramic filter for each antenna element, and may include low noise amplifiers (LNAs) and/or other power amplifiers (PAs) operably coupled to each of the ports associated with each respective one of the active antenna elements 310 described in greater detail below.

Figure 3:
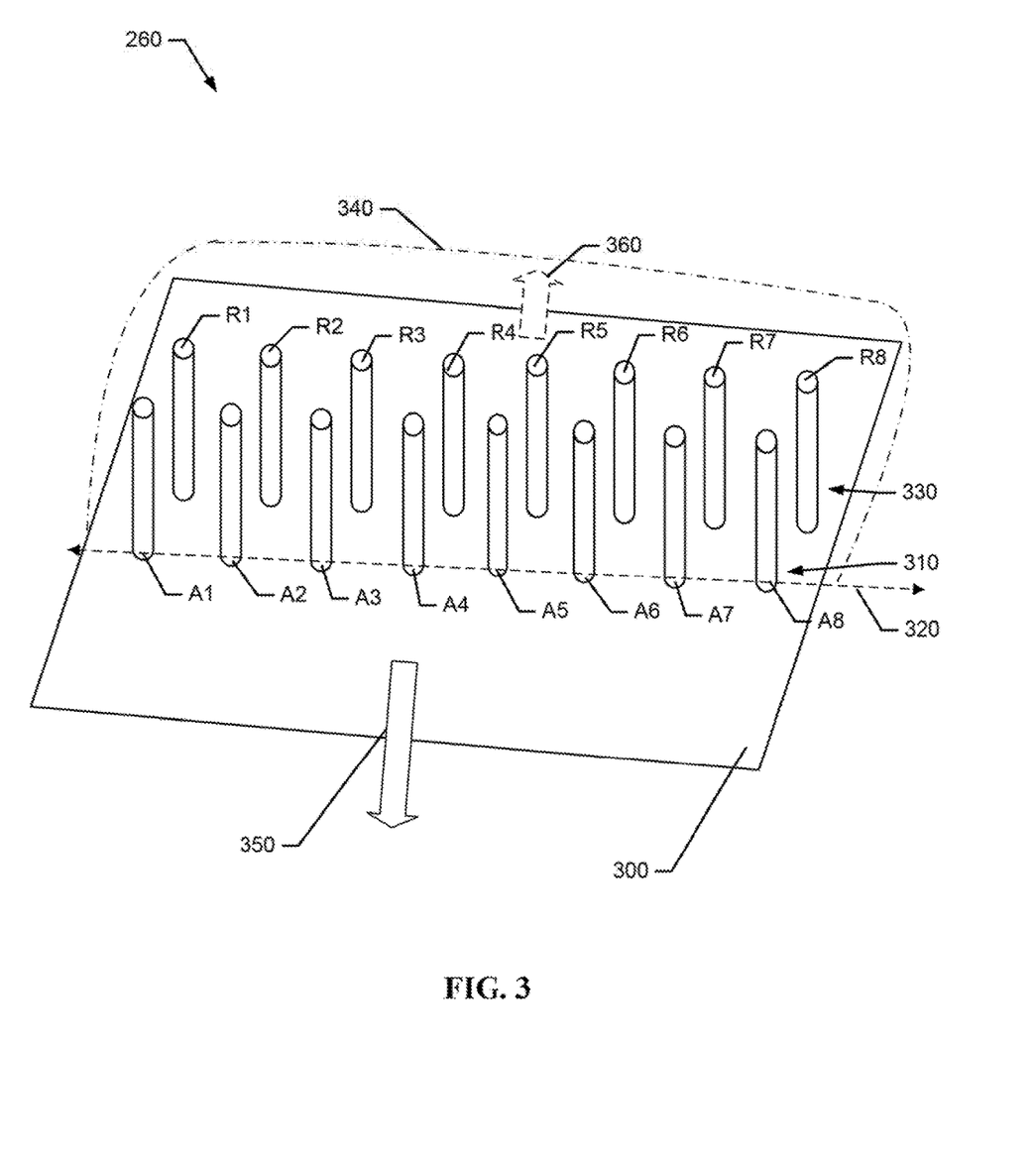
FIG. 3 illustrates a perspective view of antenna elements of an antenna assembly in accordance with an example embodiment.

FIG. 3 illustrates a plan view of the antenna assembly 260 of an example embodiment to facilitate an explanation of how the phase control module 250 of an example embodiment may function. In this regard, the antenna assembly 260 may for formed at or otherwise operably coupled to a ground plane 300. The ground plane 300 could be a surface of an aircraft (e.g., aircraft 120) or a surface of some other media that may be attached to an aircraft or a base station. A plurality of monopole active antenna elements 310 may be disposed on the ground plane 300 in a particular pattern as shown in FIG. 3. In this regard, for example, the active antenna elements 310 may be provided to be equidistant from a center of the antenna assembly 260. Each of the active antenna elements 310 may extend substantially perpendicularly away from the ground plane 300 and may be connected to radio circuitry configured for transmit/receive functions to provide signals for transmission to, or receive signals from reception at, the active antenna elements 310. In some cases, the active antenna elements 310 may have a length selected to be about a quarter wavelength for the frequency of operation of the radio circuitry.

The active antenna elements 310 may be disposed to be spaced apart from each other at fixed intervals, while also being aligned with each other along a reference line 320. Thus, the active antenna elements 310 may be disposed in a linear pattern where each of the active antenna elements 310 is located on the reference line 320. In this regard, for example, a first antenna element (A1) may be disposed at a first end of the antenna assembly 260 along the reference line 320, and the second antenna element (A2) may be disposed at a first linear distance from the first antenna element (A1) in a direction toward a second end of the antenna assembly 260 along the reference line 320. Each of the other antenna elements including a third antenna element (A3), a fourth antenna element (A4), a fifth antenna element (A5), a sixth antenna element (A6), a seventh antenna element (A7) and an eight antenna element (A8) may also be disposed along the reference line 320 in sequence. Moreover, the third antenna element (A3) may be spaced apart from each of the second antenna element (A2) and the fourth antenna element (A4) by the first linear distance, and every other antenna element may also be spaced apart from adjacent antenna elements on either side thereof by the first linear distance. The first linear distance may be selected to be less than or equal to about a quarter wavelength in some cases. All of the active antenna elements 310 may therefore be disposed equidistant from every adjacent antenna element between the first end of the antenna assembly 260 along the reference line 320 at which location the first antenna element (A1) is disposed, and the second end of the antenna assembly 260 along the reference line 320 at which location the eighth antenna element (A8) is disposed. If more or less antenna elements are used to form the antenna assembly 260 in alternative embodiments, it may be expected that the additional or fewer antenna elements would also be located along the reference line 320, and may be equidistant from each other by a distance that can be used to influence phase front control as described herein.

As shown in FIG. 3, the antenna assembly 260 may also include passive antenna elements 330 that are arranged such that one passive antenna element corresponds to each of the active antenna elements 310. The passive antenna elements 330 may be referred to as reflectors, and may include a first reflector (R1), a second reflector (R2), a third reflector (R3), a fourth reflector (R4), a fifth reflector (R5), a sixth reflector (R6), a seventh reflector (R7) and an eighth reflector (R8). In this regard, the first reflector (R1) may correspond to the first antenna element (A1), the second reflector (R2) may correspond to the second antenna element (A2), the third reflector (R3) may correspond to the third antenna element (A3), the fourth reflector (R4) may correspond to the fourth antenna element (A4), the fifth reflector (R5) may correspond to the fifth antenna element (A5), the sixth reflector (R6) may correspond to the sixth antenna element (A6), the seventh reflector (R7) may correspond to the seventh antenna element (A7), and the eighth reflector (R8) may correspond to the eighth antenna element (A8). Each of the passive antenna elements 330 may be located a fixed, second linear distance (e.g., about ¼ wavelength) from its corresponding active antenna element 310 in a direction substantially perpendicular to the direction of extension of the reference line 320. Thus, the passive antenna elements 330 may be arranged equidistant from each adjacent one of the passive antenna elements 330 by the first linear distance and may be arranged in sequence within a line that extends substantially parallel to the reference line 320.

In some examples, spacing between elements can generally range from about ¹/₁₀ to about ¼ of a wavelength depending on specific design objectives. Moreover, in some cases, the length of each of the reflectors of the passive antenna elements 330 may be slightly longer than the length of the corresponding antenna elements of the active antenna elements 310. As such, each corresponding one of the passive antenna elements 330 may absorb and re-radiate the signal generated by its corresponding one of the active antenna elements 310 in a directional way. The re-radiation may constructively interfere with and reinforce signals emanating from the antenna assembly 260 in a direction normal to the reference line 320 and oriented from the reflector toward its corresponding active element (as shown by arrow 350). Meanwhile, the absorption aspect may destructively interfere with signals emanating from the antenna assembly 260 in a direction normal to the reference line 320 and oriented from the active element toward its corresponding reflector (as shown by dashed arrow 360).

The operation of the passive antenna elements 330 may effectively act as a shield relative to signals radiating in the direction of arrow 360. Meanwhile, for a signal radiating in the direction of arrow 350, the passive antenna elements 330 may improve the gain of such signals. In an example embodiment in which the antenna assembly 260 is configured to operate in the unlicensed band (e.g., 2.4 GHz), the lengths of the active antenna elements 310 may be less than about 1.5 inches. The reflectors (R1 to R8) may be disposed about ¼ wavelength (or less than about 1.5 inches) from the active antenna elements 310 (i.e., the second linear distance) and, as noted above, may be equal to or slightly longer than the active antenna elements 310. Thus, the height of a radome 340, which houses the active antenna elements 310 and the passive antenna elements 330, off the ground plane 300 may be less than 2 inches. The second linear distance to the passive antenna elements 330 may be about 2 inches or less. Meanwhile, given that there are 8 elements in this example, the length of the radome 340 may be less than 10 inches in this example, thereby forming a fin antenna having similar height and width dimensions with a length dimension that is at least four times larger than the height or width dimension. In some cases, the height may be about 1.5 inches, the width may be about 2 inches, and the length may be about 8.5 inches. However, other specific dimensions are possible for other frequencies of operation. For example, a 5 GHz signal may be used with elements having about ½ of the dimensions noted above. Even though individual dimensions may change, the overall ratios between length, width and height may remain the same.

Although no control lines are required for operation of the passive antenna elements 330, control lines from the phase control module 250 may be used to selectively control excitation and phasing for each of the active antenna elements 310. However, in some examples, the passive antenna elements 330 may also be operably coupled to the phase control module 250, and may be alternately selected on or off to initiate or stop parasitic function. In this regard, for example, the passive antenna elements 330 could have the same length as the active antenna elements 310 and selected ones of the passive antenna elements 330 may be grounded or lengthened (e.g., by adding inductance in series) by operation of the phase control module 250. When grounded, the passive antenna elements 330 would effectively disappear and when lengthened by adding inductance in series with selected ones of the passive antenna elements 330, the corresponding lengthened passive antenna elements would become parasitic elements used to provide directivity relative to excitation at selected ones of the active antenna elements 310. By employing the phase control module 250 for the antenna assembly 260 of FIG. 3, it may be possible to select eight different pointing directions with eight possible selection options with respective different combinations of phasing and/or parasitics. However, it should be appreciated that more or fewer options may be presented in other embodiments by adding more or fewer total antenna elements.

In an example embodiment, the radome 340 may be disposed over all of the active antenna elements 310 and the passive antenna elements 330 for protection. The radome 340 may also be used to improve aerodynamic characteristics of the antenna assembly 260 for use on the aircraft 120. However, even if used on the ground, the radome 240 may generally protect the active antenna elements 310 from the weather and/or debris, etc.

In an example embodiment, as mentioned above, each of the active antenna elements 310 may be arrayed along the reference line 320 and spaced apart by the first linear distance. The alignment described above may enable the phase control module 250 to select a combination of phase front control inputs to be applied to the active antenna elements 310 to form or steer a beam in one of eight possible orientations or directions relative to a center of the antenna assembly 260 along the reference line 320. As such, the phase control module 250 may be configured to select a different combination of phase front control inputs to form or steer a beam centered at an area ranging from about 0 degrees to about 180 degrees relative to the reference line 320 on the side of the antenna assembly 260 corresponding to arrow 350. The manner of this selection will be described in greater detail below in reference to FIG. 4.

Figure 4:
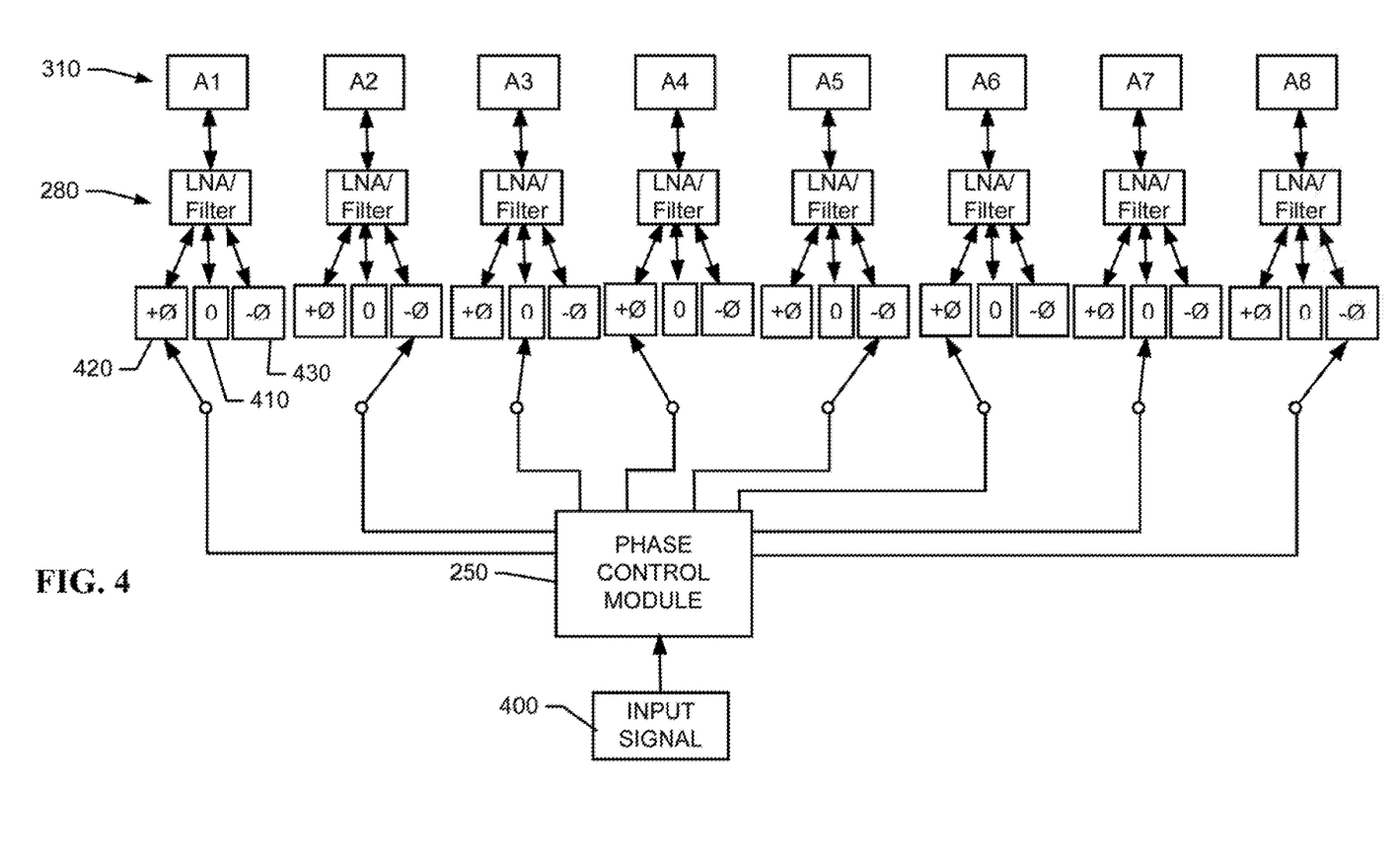
FIG. 4 illustrates a phase control module in accordance with an example embodiment.

FIG. 4 illustrates a conceptual block diagram of one example architecture for circuitry by which the phase control module 250 may implement selection of any of the combinations of phase front control inputs described above. In this regard, for example, the phase control module 250 may be configured to receive an input signal 400 that is to be transmitted in a particular direction. The phase control module 250 may be configured to, based on the particular direction, determine the phase front control inputs that will create constructive and destructive interference patterns that produce a resultant beam directed toward the particular direction. The phase front control inputs may select to apply no phase adjustment to the input signal (e.g., via a zero phase adjustment option 410), to apply a positive phase adjustment, to apply a negative phase adjustment, or to apply no signal at all. In some cases, the amount of phase adjustment may be constant and may be determined based on the geometry of the active antenna elements 310 of the antenna assembly 260. Thus, a fixed value of a first phase adjuster 420 may apply a phase adjustment to the input signal if selected by the phase control module 250. The fixed value may then be inverted (e.g., via a phase inverter) to apply a negative or inverted phase of the same fixed value. As such, while FIG. 4 illustrates a second phase adjuster 430 that is configured to apply an inverted phase of the same fixed value as the first phase adjuster 420, it should be appreciated that the second phase adjuster 430 could be embodied as the first phase adjuster 420 and a phase inverter instead of as a completely separate phase adjuster. However, it is also possible to use a separate phase adjuster that is configured to apply a negative version of the fixed value in some cases. Moreover, it is also possible to use a variable phase adjustment, where the variable phase adjustment is selected to apply a desired amount of constructive or destructive interference to generate a resultant beam having a desired central bore axis (e.g., ranging from 0 to 180 degrees relative to the reference line).

Regardless of how the value of phase adjustment is formed, the phase control module 250 may be configured to apply the corresponding adjustments to the input signal 400 before the adjusted signals are applied through the LNA/filtering components of the filter/amplifier assembly 280 and then communicated to respective ones of the active antenna elements 310. The selections made by the phase control module 250 of FIG. 4 may drive the antenna assembly 260 in the manner shown in FIGS. 5-7.

Figure 5:
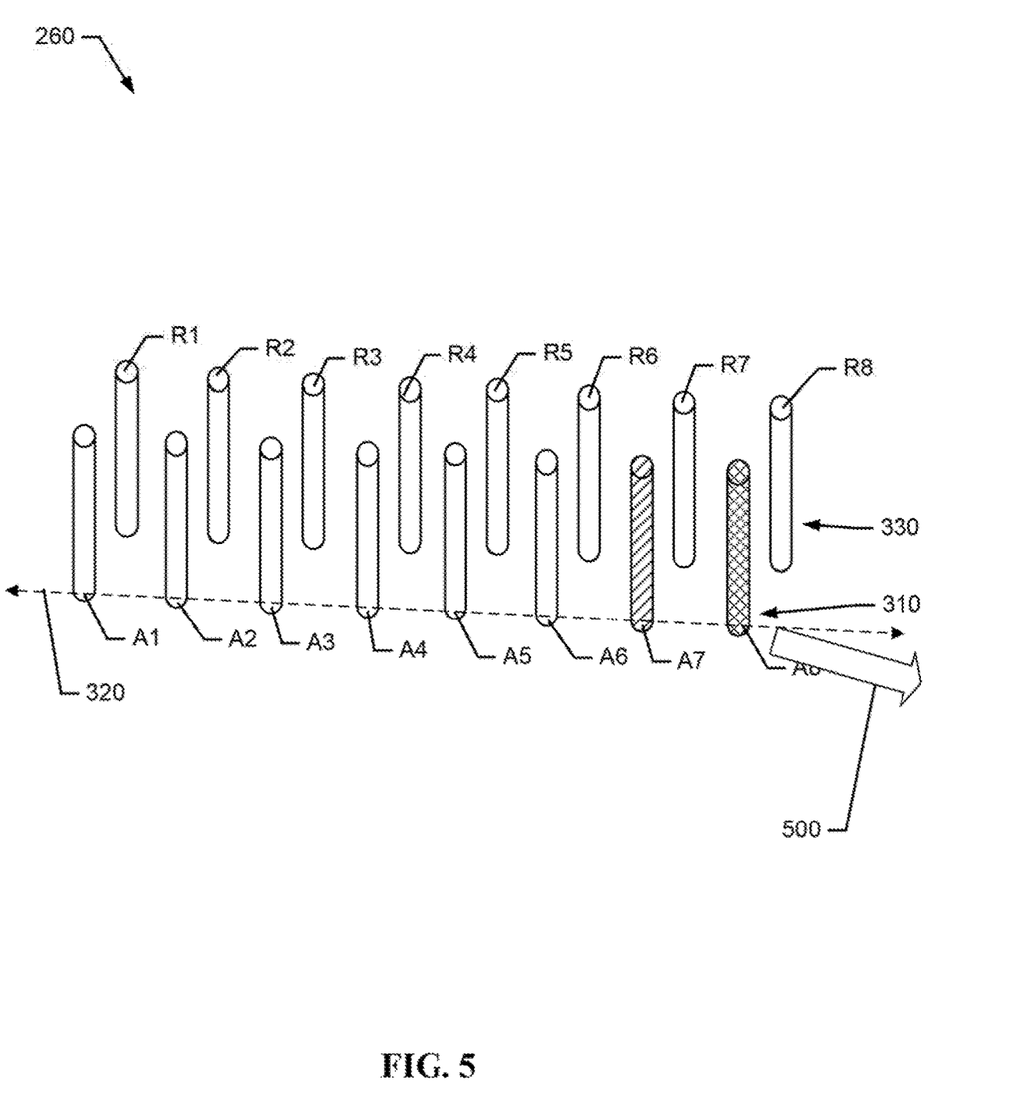
FIG. 5 illustrates the antenna assembly of FIG. 3 arranged for beam formation in accordance with an example embodiment.

In this regard, for example, FIG. 5 illustrates a situation in which the eighth antenna element (A8) is driven with a signal and the seventh antenna element (A7) is driven with signal that has a phase adjustment applied to constructively interfere with the signal produced by the eighth antenna element (A8) and generate a passively reflected, phase controlled, phase front that results in a beam centered approximately along the bore of arrow 500. Arrow 500 therefore illustrates a direction of the central axis of the resultant directive beam. For a receive signal, the same phase adjustments may be made, but to a received signal instead of to an input signal that is to be transmitted. Other ones of the active antenna elements 310 may also be phase controlled to facilitate generation of the phase front resulting in the beam corresponding to arrow 500 with corresponding phase adjustments. Thus, it need not necessarily just be an adjacent active antenna element 310 that is phase controlled.

Figure 6:
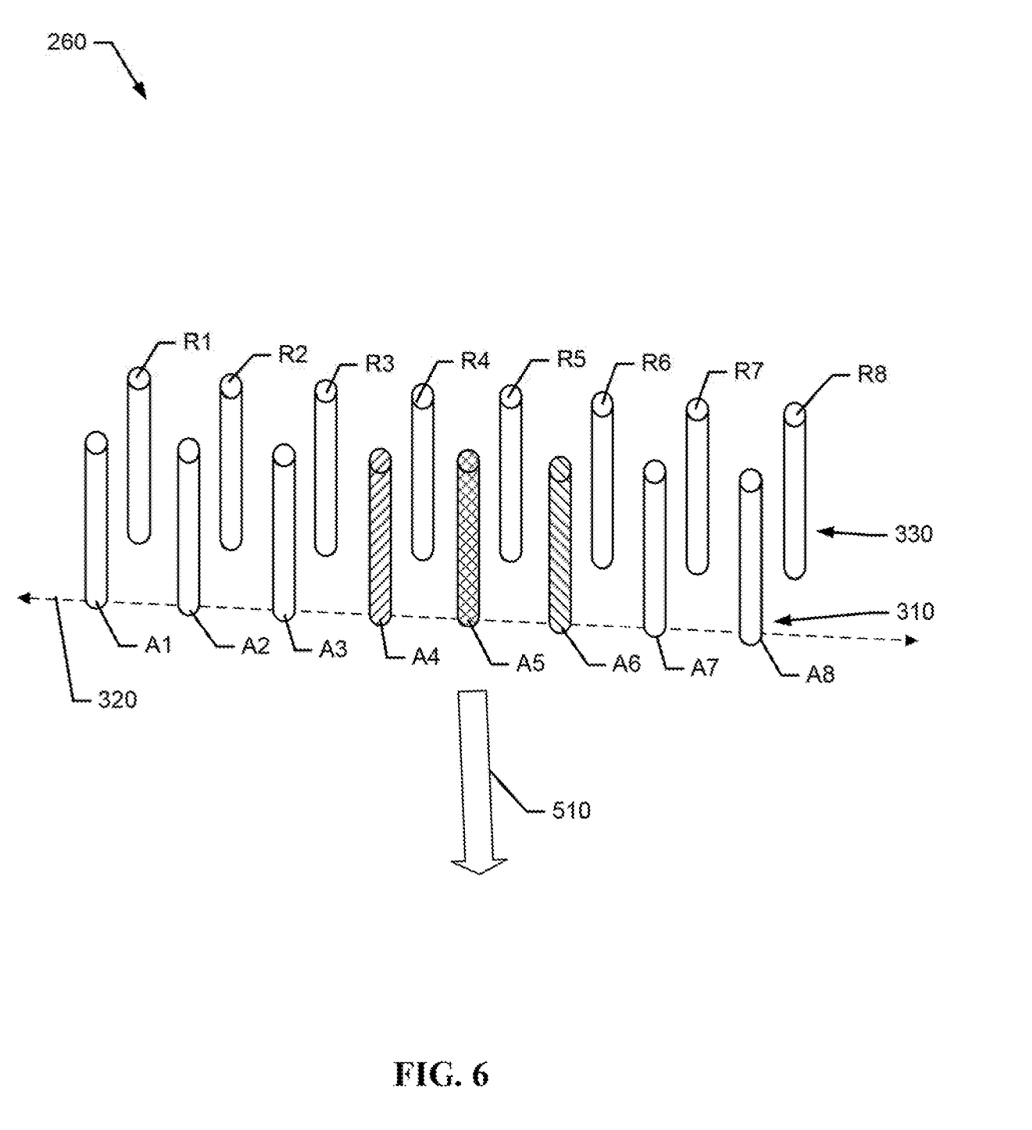
FIG. 6 illustrates the antenna assembly of FIG. 3 arranged for an alternative beam formation in accordance with an example embodiment.

FIG. 6 illustrates a diagram of an alternative driving pattern for the antenna assembly 260 in accordance with an example embodiment. In this example, the fifth antenna element (A5) may be driven with signal that has no phase adjustment. Meanwhile, the fourth antenna element (A4) and the sixth antenna element (A6), may each be driven with a phase adjustment configured to generate phase fronts that tend to constructively interfere with the signal provided to the fifth antenna element (A5) to generate a passively reflected, phase controlled, phase front that results in a beam centered approximately along the bore of arrow 510. Other ones of the active antenna elements 310 may also be phase controlled to facilitate generation of the phase front resulting in the beam discussed above with corresponding phase adjustments. Thus, it need not necessarily just be two adjacent active antenna elements 310 that are phase controlled.

Figure 7:
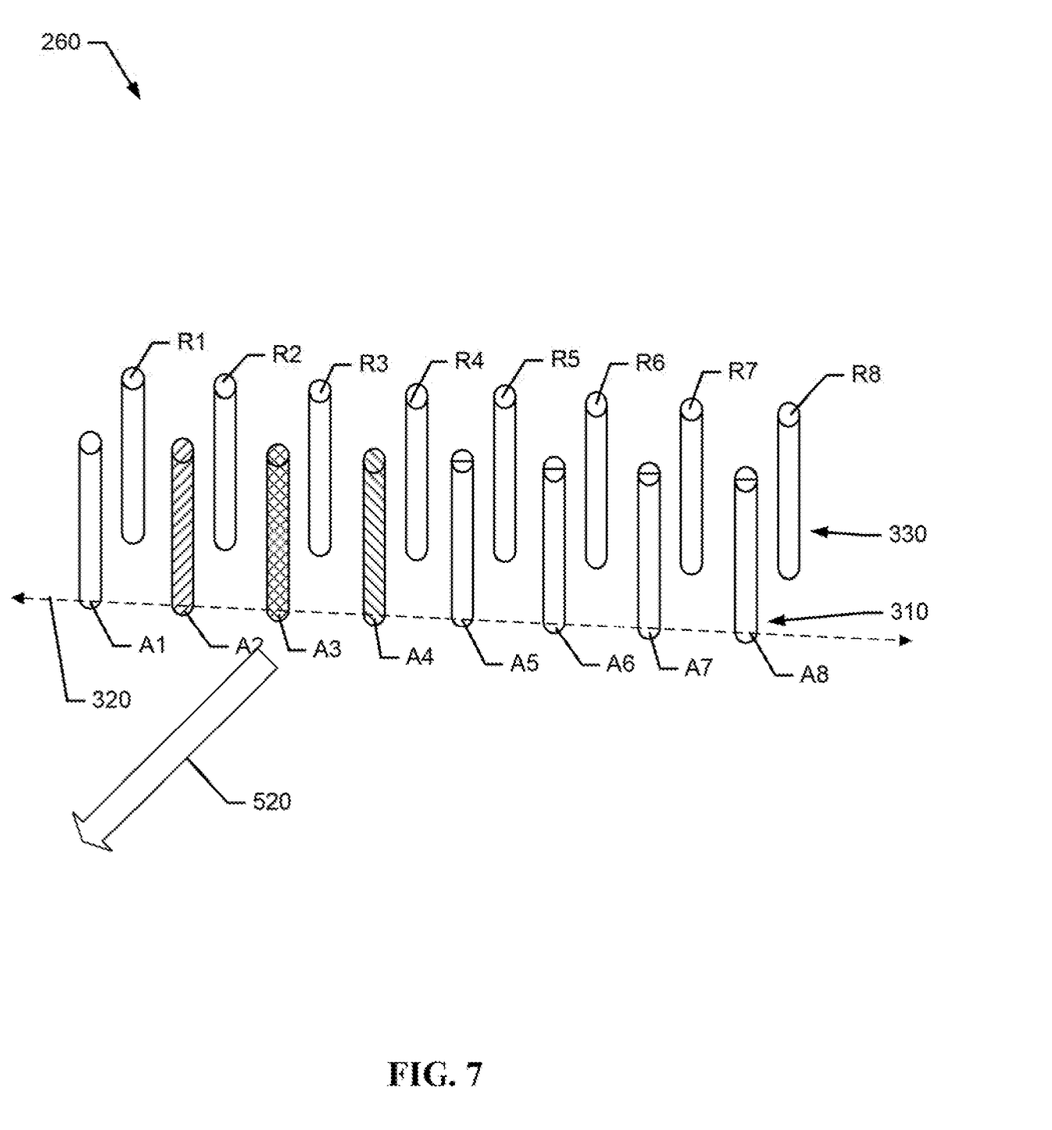
FIG. 7 illustrates the antenna assembly of FIG. 3 arranged for another alternative beam formation in accordance with an example embodiment.

FIG. 7 illustrates a diagram of an alternative driving pattern for the antenna assembly 260 in accordance with another example embodiment. In this example, the third antenna element (A3) may be driven with signal that has no phase adjustment. Meanwhile, the fourth antenna element (A4) and the second antenna element (A2), may each be driven with a phase adjustment configured to generate phase fronts that tend to constructively interfere with the signal provided to the third antenna element (A3) to generate a passively reflected, phase controlled, phase front that results in a beam centered approximately along the bore of arrow 520. Other ones of the active antenna elements 310 may also be phase controlled to facilitate generation of the phase front resulting in the beam discussed above with corresponding phase adjustments. Thus, it need not necessarily just be two adjacent active antenna elements 310 that are phase controlled.

In the examples described above, the antenna assembly 260 generates a resultant directive beam oriented in a direction determined by the phase front control inputs provided by the phase control module 250. Of note, each of the resultant directive beams may have a substantially fixed and similar elevation that extends substantially away from the antenna assembly 260 perpendicular to the direction of extension of the elements. The ground plane 300 may limit the beam width elevation, so the beam width may extend substantially away from the ground plane 300 by some amount. In an example embodiment, the width of the beam in altitude or elevation may be about 70 degrees, as measured at the half power points (−3 dB) from the main lobe that is oriented in the direction of the arrows 500, 510 and 520 for a situation where the ground plane 300 is about four feet in diameter. Meanwhile, the width of the beam in azimuth may be about 39 degrees, as measured at the half power points (−3 dB). The use of eight antenna elements, as described in FIGS. 3-7 may enable the steering of 8 individual resultant directive beams. Although the beam width in elevation remains fixed (e.g., at about 70 degrees) and there is no steering in elevation, the beams can be steered fully over a range of about 0 degrees to about 180 degrees relative to the reference line 310 around the active antenna elements 310 (in the manner described above) in azimuth.

Accordingly, example embodiments may achieve a 180 degree coverage (in transmit and receive mode) for beam steering in azimuth using eight antenna elements that require no remote power, and only passive RF filters. To achieve 360 degree coverage, the structure of FIG. 3 can be duplicated to create a dual fin antenna where the same structure shown is inverted in orientation on the opposing side of the passive antenna elements 330. Thus, the antenna assembly 260 of FIG. 3 can generate steerable beams on the side of the reference line 320 corresponding to arrow 350, and the duplicated (but with inverted orientation) structure may be located on the side of the passive antenna elements 330 that corresponds to arrow 360. Such a dual fin antenna may be controlled by the same or a different phase control module 250 than the one shown in FIGS. 2 and 4. The RRH 270 of some example embodiments may handle digital beam forming, and the RRH 270 may require power, control and data lines from the beamforming control module 200, but all such lines need not be extended to the antenna assembly 260. Instead, only the data lines need extend to the antenna assembly 260 via the filter/amplifier assembly 280 based on the adjustments made by the phase control module 250. Eight transmit/receive ports may be provided and eight switchable quadrants may result.

Some example embodiments, while operating at unlicensed band frequencies (e.g., 2.4 GHz), may achieve a peak gain of about 10-12 dB (broadside), with minimum gain over the width of the beam of about 7 to 8 dB (endfire). Side-lobe characteristic patterns from the peak have been measured at −8 dB below main peak, and are scan angle and element amplitude weighting dependent. Accordingly, example embodiments provide a radio capable of digital beamforming, which can provide dual polarization in accordance with design objectives. Thus, for example, if the ground plane 300 is formed at a surface of the underneath portion of a wing or fuselage of the aircraft 120, the vertical beam elevation may essentially point the beam toward the horizon. As noted above, this may reduce interference with transmitters immediately below the aircraft 120, and may therefore be advantageous within an ATG network context.

In accordance with an example embodiment, a directive antenna assembly may be provided. The antenna assembly may include a plurality of active antenna elements disposed in a first linear array along a reference line and equidistant from each adjacent antenna element by a first linear distance, and a plurality of passive antenna elements disposed in a second linear array extending parallel to the reference line such that each passive antenna element is a second linear distance away from a corresponding one of the active antenna elements. The antenna assembly may include or may be operably coupled to a phase control module configured to apply selected phase fronts to selected ones of the antenna elements to generate constructive and destructive interference patterns to define a directive beam in a desired direction in a range between about 0 and 180 degrees relative to the reference line.

The antenna assembly described above may include additional features, modifications, augmentations and/or the like in some cases. Such features, modifications, or augmentations may be optional, and may be combined in any order or combination. For example, in some cases, a number of the active antenna elements and a number of the passive antenna elements may be eight. In some cases, the second linear distance may be about equal to a quarter wavelength of a frequency of operation of the antenna assembly, and the first linear distance may be less than or equal to the second linear distance. In an example embodiment, the frequency of operation may be about 2.4 GHz, and the first and second linear distances may each be about 1.5 inches. In some cases, the antenna assembly further includes a ground plane at which the active and passive antenna elements are mounted such that the active and passive antenna elements each extend substantially perpendicularly away from the ground plane and parallel to each other. In an example embodiment, the ground plane may be formed at the physical interface of an aircraft wing or fuselage (e.g., at an underside of the wing or fuselage). In some cases, a radome houses the active and passive antenna elements, and the radome may be operably coupled to the aircraft wing or fuselage. In an example embodiment, the radome may have a width of less than about 2 inches and a height of less than about 1.5 inches, the radome may have a length of less than about 8.5 inches, and the ground plane may be at least 4 feet in diameter. In some cases, the antenna assembly comprises a fin antenna having a length dimension that is at least four times larger than a height dimension and width dimension of the fin antenna. In an example embodiment, the phase control module may be disposed at a remote radio head provided between the antenna assembly and a beamforming control module. The beamforming control module may be configured to provide instructions to the phase control module for generating the selected phase fronts. In some cases, the phase control module may be configured to apply no phase adjustment to a selected active antenna element, and apply a selected phase adjustment to at least one adjacent active antenna element to the selected active antenna element to form a resultant directive beam. In an example embodiment, responsive to operation of the phase control module, the antenna assembly may be configurable to steer a directive beam having a beamwidth of about 39 degrees in the range between about 0 to 180 degrees in azimuth with a fixed beamwidth in elevation. In some cases, the antenna assembly may be configured to be disposed on an aircraft, and the fixed beamwidth in elevation may be directed toward the horizon and be about 70 degrees in elevation. In an example embodiment, the antenna assembly may further include a second plurality of active antenna elements disposed in a third linear array along a second reference line extending parallel to the first reference line, and a second plurality of passive antenna elements disposed adjacent the plurality of passive antenna elements in a fourth linear array extending parallel to the second reference line such that each passive antenna element of the second plurality of passive antenna elements is adjacent to a corresponding one of the second plurality of active antenna elements to define a dual fin antenna.

Figure 8:
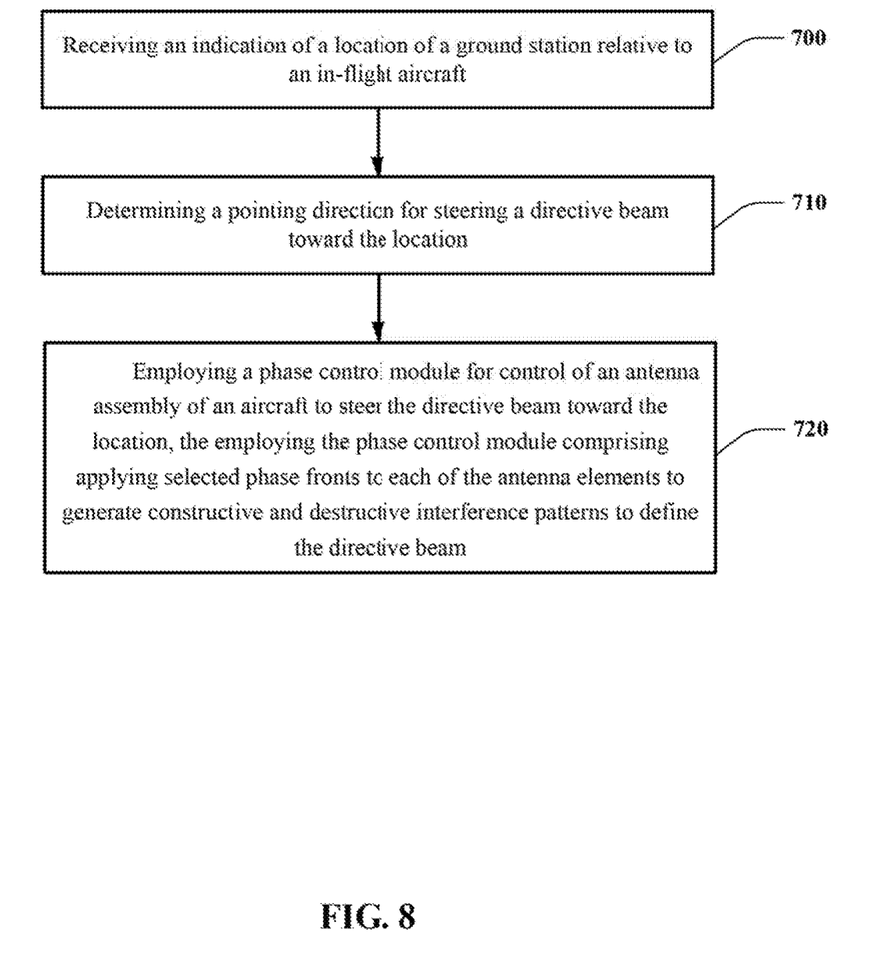
FIG. 8 illustrates a block diagram of a method of forming a directive beam in accordance with an example embodiment.

FIG. 8 illustrates a block diagram of one method that may be associated with an example embodiment as described above. From a technical perspective, the processing circuitry 210 described above may be used to support some or all of the operations described in FIG. 8. As such, FIG. 8 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a device (e.g., the beamforming control module 200, and/or the like) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 8, may include receiving an indication of a location of a ground station relative to an in-flight aircraft at operation 700 and determining a pointing direction for steering a directive beam toward the location at operation 710. The method may further include employing a phase control module for control of an antenna assembly of an aircraft to steer the directive beam toward the location at operation 720. The antenna assembly may include a plurality of active antenna elements disposed in a first linear array along a reference line and equidistant from each adjacent antenna element by a first linear distance, and a plurality of passive antenna elements disposed in a second linear array extending parallel to the reference line such that each passive antenna element is a second linear distance away from a corresponding one of the active antenna elements. Employing the phase control module may include applying selected phase fronts to selected ones of the antenna elements to generate constructive and destructive interference patterns to define a directive beam in a desired direction in a range between about 0 and 180 degrees relative to the reference line.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An antenna assembly comprising:
   a plurality of active antenna elements disposed in a first linear array along a reference line and equidistant from each adjacent antenna element by a first linear distance;
   a plurality of passive antenna elements disposed in a second linear array extending parallel to the reference line such that each passive antenna element is a second linear distance away from a corresponding one of the active antenna elements; and
   a ground plane at which the active and passive antenna elements are mounted such that the active and passive antenna elements each extend substantially perpendicularly away from the ground plane and parallel to each other,
   wherein the antenna assembly includes or is operably coupled to a phase control module configured to apply selected phase fronts to selected ones of the antenna elements to generate constructive and destructive interference patterns to define a directive beam in a desired direction in a range between about 0 and 180 degrees relative to the reference line, and
   wherein the ground plane is formed at an underside of an aircraft wing or fuselage.

2. The antenna assembly of claim 1, wherein a number of the active antenna elements and a number of the passive antenna elements is eight.

3. The antenna assembly of claim 2, wherein the second linear distance is about equal to a quarter wavelength of a frequency of operation of the antenna assembly, and
   wherein the first linear distance is less than or equal to the second linear distance.

4. The antenna assembly of claim 3, wherein the frequency of operation is about 2.4 GHz, and the first and second linear distances are each about 1.5 inches.

5. The antenna assembly of claim 1, wherein a radome houses the antenna elements, the radome being operably coupled to the aircraft wing or fuselage.

6. The antenna assembly of claim 5, wherein the radome has a width of less than about 2 inches and a height of less than about 1.5 inches,
   wherein the radome has a length of less than about 8.5 inches,
   and wherein the ground plane is at least 4 feet in diameter.

7. The antenna assembly of claim 6, wherein the antenna assembly comprises a fin antenna having a length dimension that is at least four times larger than a height dimension and width dimension of the fin antenna.

8. The antenna assembly of claim 1, wherein the phase control module is disposed at a remote radio head provided between the antenna assembly and a beamforming control module, the beamforming control module being configured to provide instructions to the phase control module for generating the selected phase fronts.

9. The antenna assembly of claim 8, wherein the phase control module is configured to apply no phase adjustment to a selected active antenna element, and apply a selected phase adjustment to at least one adjacent active antenna element to the selected active antenna element to form a resultant directive beam.

10. The antenna assembly of claim 9, wherein, responsive to operation of the phase control module, the antenna assembly is configurable to steer a directive beam having a beamwidth of about 39 degrees in the range between about 0 to 180 degrees in azimuth with a fixed beamwidth in elevation.

11. The antenna assembly of claim 10, wherein the antenna assembly is configured to be disposed on an aircraft, and wherein the fixed beamwidth in elevation is directed toward the horizon, and
   wherein the fixed beamwidth is about 70 degrees in elevation.

12. The antenna assembly of claim 1, further comprising a second plurality of active antenna elements disposed in a third linear array along a second reference line extending parallel to the first reference line; and
   a second plurality of passive antenna elements disposed adjacent the plurality of passive antenna elements in a fourth linear array extending parallel to the second reference line such that each passive antenna element of the second plurality of passive antenna elements is adjacent to a corresponding one of the second plurality of active antenna elements to define a dual fin antenna.

* * * * *

UNITED STATES PATENT AND TRADEMARK OFFICE
CERTIFICATE OF CORRECTION

| | | |
|---|---|---|
| PATENT NO. | : 11,996,627 B2 | Page 1 of 1 |
| APPLICATION NO. | : 17/297033 | |
| DATED | : May 28, 2024 | |
| INVENTOR(S) | : Gerard James Hayes et al. | |

It is certified that error appears in the above-identified patent and that said Letters Patent is hereby corrected as shown below:

On the Title Page

In Item (72), "Elbert Stanford Eskridge, Jr., Chapel Hil, NC (US)" should read -- Elbert Stanford Eskridge, Jr., Chapel Hill, NC (US) --

Signed and Sealed this
Eighteenth Day of March, 2025

Coke Morgan Stewart
*Acting Director of the United States Patent and Trademark Office*